United States Patent [19]

Hamaekers et al.

[11] Patent Number: 4,666,137
[45] Date of Patent: May 19, 1987

[54] HYDRAULICALLY DAMPED ELASTIC MOTOR MOUNT HAVING AN IMPROVED GRID AND PARTITION ARRANGEMENT

[75] Inventors: Arno Hamaekers, Hemsbach; Hans-Joachim Rudolf, Rastede, both of Fed. Rep. of Germany

[73] Assignee: Firma Carl Freudenberg, Weinheim/Bergstr., Fed. Rep. of Germany

[21] Appl. No.: 774,174

[22] Filed: Sep. 9, 1985

Related U.S. Application Data

[63] Continuation-in-part of Ser. No. 512,142, Jul. 8, 1983, abandoned.

[30] Foreign Application Priority Data

Jul. 9, 1982 [DE] Fed. Rep. of Germany ....... 3225701

[51] Int. Cl.⁴ .................. F16F 13/00; F16F 15/04; B60K 5/12; F16K 17/26
[52] U.S. Cl. .................. 267/140.1; 137/493; 267/8 R
[58] Field of Search .......... 267/140.1, 141, 141.4, 267/136, 113, 63 R, 64.13, 64.15, 64.23, 64.27, 35; 248/562, 559, 636, 634, 632; 180/300; 137/843, 849, 859, 493; 251/120, 126

[56] References Cited

U.S. PATENT DOCUMENTS

| | | | |
|---|---|---|---|
| 2,941,544 | 6/1960 | Peras | 137/859 X |
| 3,245,426 | 4/1966 | Kreuter et al. | 137/859 X |
| 3,395,858 | 8/1968 | Spencer et al. | 137/849 X |
| 3,490,488 | 1/1970 | Grist | 137/849 X |
| 3,811,466 | 5/1974 | Omringer | 137/493 |
| 4,045,009 | 8/1977 | Pees | 137/859 X |
| 4,159,091 | 6/1979 | Le Salver et al. | 267/113 X |
| 4,422,779 | 12/1983 | Hamaerers et al. | 267/140.1 X |

FOREIGN PATENT DOCUMENTS

| | | | |
|---|---|---|---|
| 0027751 | 4/1981 | European Pat. Off. | 267/35 |
| 0040290 | 11/1981 | European Pat. Off. | |
| 1112598 | 11/1955 | France | |
| 1132284 | 3/1957 | France | 137/843 |
| 0572433 | 1/1958 | Italy | 137/859 |

Primary Examiner—Andres Kashnikow
Assistant Examiner—Robert J. Oberleitner

[57] ABSTRACT

A hydraulically damped motor mount is provided comprising a bearing plate, annular resilient member and a bottom plate forming a working spaced filled with hydraulic liquid which is connected through a choke opening to a liquid filled equalization space of variable volume. Two grid plates are disposed between the working space and the equalization space. A thin partition is disposed between the two grid plates. The grid bars of both grid plates continuously rest against the partition. The partial regions of the partition associated with the grid openings are provided with a separation which comprises a cut having a maximum width of 0.2 times the thickness of the partition. The smalles width of each grid opening is about 2.5 to 25 times the thickness of the partition.

11 Claims, 17 Drawing Figures

HYDRAULICALLY DAMPED ELASTIC MOTOR MOUNT HAVING AN IMPROVED GRID AND PARTITION ARRANGEMENT

This application is a continuation of application Ser. No. 512,142 filed Jul. 8, 1983 now abandoned.

FIELD OF INVENTION

This invention relates to a hydraulically damped elastic or rubber mount for vibrating equipment. More particularly, this invention relates to a hydraulically damped elastic or rubber motor mount having a bearing core, an annular rubber or elastic resilient element and a bottom plate which surround a working space which is filled with a hydraulic liquid. The working space is connected through a choke opening to a hydraulic liquid-filled equalization space which is of variable volume. A thin partition member fabricated from a soft-elastic material is provided between the working space and the equalization space and is clamped liquid-tight between grids. The partition has at least one partial region which is movable in the direction of introduced vibrations.

BACKGROUND OF THE INVENTION

European Patent Application No. 40 290 discloses a hydraulically damped elastic motor mount. The partial region of the partition is movable in the direction of the introduced vibrations and has a spaced axial distance from the bars of the grid. The partition moves and comes to a stop at the grid bars if vibrations with large amplitude are introduced. This prior art motor mount develops disagreeable noise and is likely to be subject to premature wear. A good damping effect is obtained only if vibrations of a narrow limited frequency spectrum are introduced.

French Patent No. 11 12 598 discloses a partition fabricated from an elastic material which is fixed in a piston and which has breakthroughs which expand if large amounts of liquid pass through. The breakthroughs are bounded in circular fashion which results in a strongly progressive damping behavior. A good damping effect is obtained only if vibrations of a narrow limited frequency range are introduced.

OBJECT OF THE INVENTION

It is therefore an object of the present invention to provide a hydraulically damped rubber or elastic motor mount, particularly useful for supporting an internal-combustion engine in a motor vehicle, which greatly reduces noise development and has a substantially increased service life.

It is a further object of the present invention to provide a hydraulically damped rubber or elastic motor mount which is highly effective in damping low-frequency vibrations of a wide frequency spectrum as well as isolating highfrequency vibrations from about 30 Hz and greater.

These and other objects will become apparent from the following description and claims in conjunction with the drawings.

SUMMARY OF THE INVENTION

In accordance with the present invention, there is provided a hydraulically damped rubber or elastic mount for vibrating equipment having upper and lower grids wherein the grid bars continuously rest against the partition disposed therebetween. The smallest width of the grid openings of each grid corresponds to 1.5 to 25 times the thickness of the partition. At least one of the partial regions of the partition associated with the grid openings has at least one separation comprising a cut with a maximum width of 0.2 times the thickness of the partition.

"Width" as used in connection with grid openings is understood herein to be the mutual spacing of two opposite boundary surfaces of each grid opening.

BRIEF DESCRIPTION OF THE DRAWINGS

In the drawings forming part hereof.

In the figures of the drawings, like parts are indicated by like reference numerals.

DESCRIPTION OF THE PREFERRED EMBODIMENTS

In order to afford a more complete understanding of the present invention and an appreciation of its advantages, a description of the preferred embodiments is presented below.

The partition 11, in accordance with the present invention, contrary to the partition disclosed by European Application No. 40 290, has no partial regions which can move between stops arranged on both sides of the partition if vibrations with a large amplitude are introduced. Accordingly, neither contact noises can occur nor wear caused by the contact of the grids which are fabricated from metallic material. This alone might be a reason for the substantially increased service life of the mount of the invention.

In addition to these advantages, the hydraulically damped rubber or elastic motor mount of the present invention results in a good isolation effect if high-frequency vibrations with a low amplitude are introduced. The liquid volume to be compensated is taken up without great resistance by the partition 11 which bulges alternatingly into the recesses of the grids 4, 5. The good damping effect for low-frequency vibrations of large amplitude results in part from the choke effect of the choke opening connecting the working space to the equalization space, and in part from the choke effect of the separation or cut 14 which opens into a gap. For this reason, the elastic motor mount of the invention is particularly well suited as an engine support for a motor vehicle.

Figure 1:
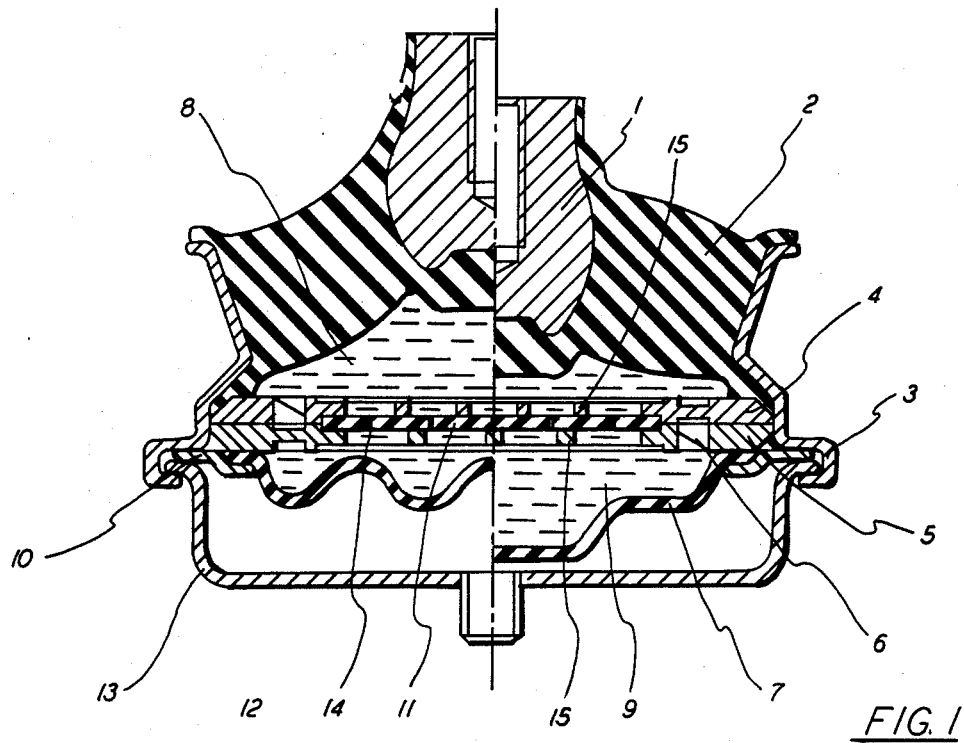
FIG. 1 is a cross-sectional view of a hydraulically damped rubber motor mount in accordance with one embodiment of the present invention wherein the equalization space is bounded by a rolling diaphragm.
Figure 2:
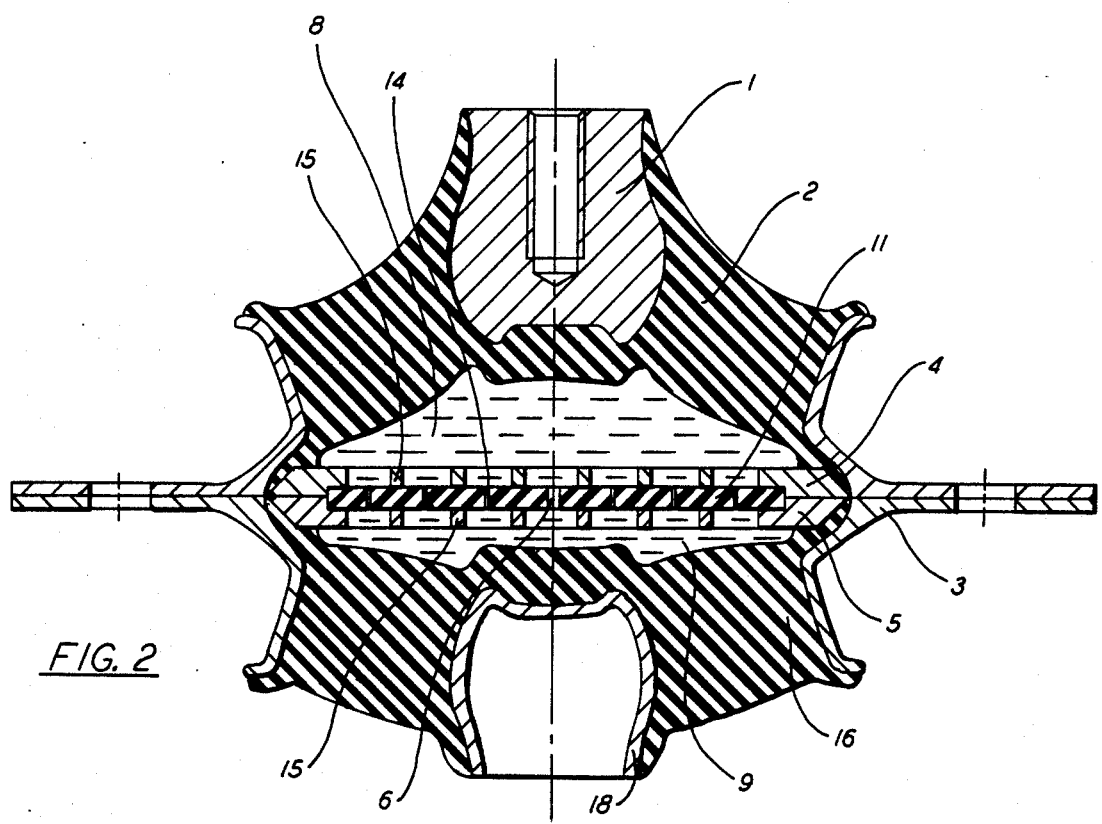
FIG. 2 is a cross-sectional view of another embodiment of the present invention similar to that of FIG. 1 wherein the equalization space is bounded by an annular or ring-like resilient member.
Figure 3:
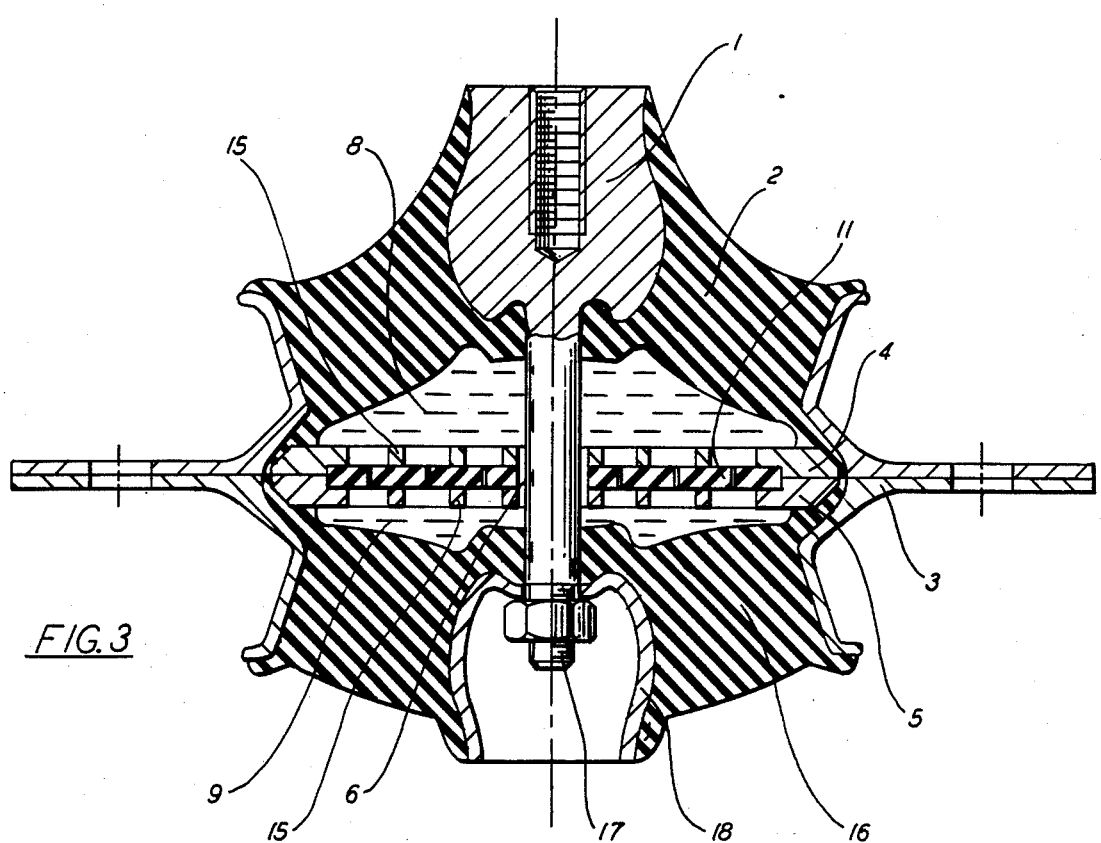
FIG. 3 is a cross-sectional view of still another embodiment of the present invention similar to that of FIG. 2 wherein the annular or ring-like resilient member bounding the equalization space surrounds a bottom socket which is rigidly connected to the bearing core by a bolt or pin.

The reasons for the excellent operating behavior and the long service life of the motor mount, in accordance with the present invention, can be explained as follows. The breakthroughs 14 cutting through the partition portions associated with the grid openings open up upon bulging of the partition 11 (see FIG. 17) and favor a pressure equalization between the working space 8 and the equalization space 9. (FIGS. 1, 2 and 3). In this manner, the occurrence of pressure peaks is reliably prevented. Thus, the occurrence of cavitation phenomena which contribute to the development of disagreeable noise is reliably prevented.

In order to obtain a good damping effect, it is of decisive importance that the cutthroughs 14 are made so narrow that the passage of liquid is prevented to the largest possible extent when the partition is in the undeformed condition. Therefore, the width of the cut or separation 14 should not be more than 0.2 times the thickness of the partition. More advantageously, the separation 14 should comprise a cut produced without the removal of material such as by a simple stamping operation.

The length of the separation is limited by a minimum value which corresponds to 3-times the thickness of the partition 11. The separation 14 is not limited in maximum length as long as it is assured that the surface of the partition 11 which are opposite each other in the region of the separation and are moved away from each other when the partition 11 bulges, move back to their original position when the direction is reverse. As a general rule, the maximum length of the cut or separation 14 may be 20 times the thickness of the partition 11. Larger ratios require individual testing for safe and satisfactory operation of a particular design. If the latter is disturbed, a remedy can be provided by using identical grids which are related to each other in mirror symmetry and the grid bars of which bridge the separations 14 of the partition 11 at shorter distances and thereby fix them. The separations 14 open up to form a slot, if a limit pressure is exceeded, only so far as is necessary to keep the pressure constant. A variation of the length of the cut or separation is therefore automatically compensated for by the design and the elasticity of the partition. At this pressure, the flow through the choke opening 6 is an optimum.

The thickness and the elasticity of the partition 11 as well as the size of the cut or separation 14 and the size of the grid openings must be designed so that the liquid volume displaced by the vibrating bearing plate 1 and the annular resilient element 2 at high frequency of low amplitude vibrations corresponds to that of the components of the partition which bulge without great resistance. The separation 14 must not exhibit an appreciable increase of the cross-section. Under this operating condition, no liquid passes to an appreciable degree through the choke opening 6 either.

If vibrations with a large amplitude and low frequency are introduced, the pressure acting on the partition 11 is increased with increasing frequency. This pressure increase is initially counteracted by the increasing passage of liquid through the choke opening 6. This reaches its optimum when the limit pressure is reached and thereafter falls again. This drop in liquid passage through the choke opening 6 is counteracted in accordance with the present invention, by the separations 14 in partition 11 which open to form a slot of matched cross-section. This supplements the available liquid passage cross-section between the working space 8 and the equalization space 9 and thereby has a pressure-stabilizing effect. It thus assures a choked optimal volume exchange of liquid between the two spaces. The motor mount of the invention thereby exhibits good damping behavior in a wide frequency range which distinguishes it substantially from a design having a rigid or spontaneously decreasing or spontaneously increasing choke cross-section. For instance, with respect to the support of an internal-combustion engine in a motor vehicle, such an effect is desirable to suppress sputtering motions of the engine which occur when travelling over uneven ground. Elastic hardening of a hydraulically damped motor mount, which interfers with the travel comfort, does not occur with the hydraulic motor mount in accordance with the invention.

The grid bars 15, in accordance with the present invention, may be designed symmetrically or asymmetrically or arranged in mirror symmetry with the partition or offset. A partition can be used which is severed vertically by a straight cut or separation 14 or which has a modified cut. A modified cut or separation 14 may be a uniformly or nonuniformly curved design which may also extend through the partition at an angle with respect to the surface of the partition. The cut or separation 14 may have an asymmetrical relation to the recess or grid opening with which it is associated. Modified cuts result in a different permeability of the separation in both directions as does the use of grids with cutouts or openings of different size. This effect can be increased substantially by combining several of the mentioned features. Several, optionally differently designed separations can be related to each other in a pattern, wherein the pattern comprises mutually parallel separations 14 which have a mutual spacing between them which is at least as large as the thickness of the partition 11. A design can be obtained in the simplest way by simple stamping-out of a partition 11 from a web of rubber, elastomer or plastic resilient material which is provided with separations arranged accordingly. One or both surfaces of the thin material forming the partition may be profiled or uneven in relief-like fashion. That is, the surface may have small bumps or ribs thereon. The punched out disc which comprises the partition 11 is squeezed between the grids 4, 5 in such a manner that preferably at least one separation 14 is associated with at least one grid opening. If separations are arranged with corresponding density, a suitable relationship between the separations and grid opening presents no particular difficulty and can optionally be made automatically. The squeezing of the partition 11 between the grids 4, 5 must be such to assure secure mounting of the partition 11 without resulting in the opening up of the separations 14 of the partition 11 in the rest position. The use of material which is provided with bumps or ribs at the surfaces facilitates meeting this condition. Many possibilities exist with respect to the mutual relationship of several separations 14. Many detailed examples will hereinafter be given. In one advantageous embodiment of the present invention, the pattern formed by the separations 14 comprises separations 14 arranged on intersecting lines with a mutual spacing which is at least as large as the thickness of the partition 11.

Illustrative embodiments of the present invention are explained in greater detail in the following with reference to the drawings.

The motor mount, according to the embodiment of the present invention illustrated in FIG. 1, comprises a bearing core 1 which is connected to a bottom plate 3 by a hollow-cone resilient rubber element 2, for example, by vulcanizing. The bearing core 1, the resilient rubber element 2, and the bottom plate 3 enclose working area 8 which is filled with hydraulic liquid. The bottom plate 3 supports an arrangement of the two grids 4, 5, through which a choke opening 6 passes in the axial direction. Choke opening 6 encloses the open area in spiral fashion, and merge into each other and at the same time enclose the partition 11. Partition 11 has a thickness, e.g., of 1.5 mm and may be fabricated, e.g., from rubber with a Shore A hardness of 44. The partition 11 is elastically clamped between all grid bars 15 of the two grids, 4, 5 as well as the outer portions of the two grids 4, 5.

The bottom plate 3 is connected to the cup-shaped bottom cap 12 by rolling-over or crimping of the bottom plate 3. The bottom cap 12 carries a fastening bolt for bolting to, e.g., a motor vehicle body. The bottom cap 12 is also provided with a venting opening 13 in order to prevent a pressure build-up in the interior.

Between the circular flange of the bottom cap 12 and the roll-over of the bottom plate 3, clamping plate 10 is enclosed which serves for the liquid-tight anchoring of rolling bellows 7. The rolling bellows 7 comprises a flexible thin member and defines the equalization space 9 proper. The working space 8, the equalization space 9 and the choke opening 6 are completely filled with a hydraulic liquid.

The grid openings of the grids 4, 5 are bounded in circular fashion and, by way of example, may have a diameter of 8 mm each for top grid 4 and a diameter of 12 mm each for bottom grid 5. The partition 11 is separated in each grid opening by a straight cut 14. The separation or cut 14 is centered with respect to the grid openings of the grid 4 but is off center with respect to the grid openings of the grid 5. All edges of the grids resting against the partition 11 are rounded.

The cross-sectional view according to FIG. 1 illustrates the motor mount of the invention in the left part with a maximum outward resilient excursion of the bearing core 1, and in the right part with an extreme inward resilient excursion of the bearing core. Accordingly, the rolling bellows 7 occupy corresponding extreme positions which are not exceeded during design operations so that contacts between the movable and the fixed parts of the motor mount does not occur.

The embodiment of the present invention in accordance with FIG. 2 differs from the embodiment of FIG. 1 in that the lower equalization space 9 is bounded by an elastic resilient ring-like member 16 of hollow-cone shape which surrounds and is joined to the bottom sleeve 18. In the embodiment of FIG. 2, the choke opening 6 is not a fixed component of the grids 4, 5 but rather it passes through the partition 11 as a cylindrical hole with a diameter which may be, e.g., 7 mm. The grids 4, 5 with the grid bars 15 press continuously against the surface of the partition 11. In the embodiment of FIG. 2, the grid bars 15 are related to each other with mirror symmetry and therefore give a firmer support to the partition 11.

The embodiment of the present invention illustrated in FIG. 3 is similar to that illustrated in FIG. 2. The bearing core 1 and the bottom socket 18, however, are rigidly joined or screwed together in this case by a bolt 17. Thus, the resilient forces of the resilient ring 16 and the resilient element 2 supplement each other directly. The choke opening 6 is formed by the gap between the bolt 17 and the two grids 4, 5 and the bolt 17 and a cutout in the partition 11. Otherwise, the hereinabove description substantially applies to the embodiment of FIG. 3.

In FIGS. 4 to 15 various embodiments of grids, in accordance with the present invention, are illustrated which are underlaid with a second, not visible, grid which is arranged with mirror symmetry. Both grids enclose a partition 11 and continuously clamp it between them. In each of the grid openings, at least one separation 14 is provided which cuts through the partition 11 in the vertical direction. The partition has generally, by way of example, a thickness of about 0.5 to 3 mm. The partition 11 advantageously comprises a rubber-elastic material such as rubber or a suitable elastomer with a Shore A hardness of, e.g., about 40 to 45.

Figure 4:
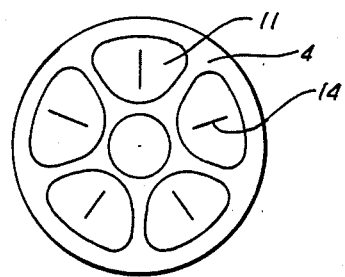
FIGS. 4 to 15 illustrate top views of various embodiments of grids with partitions visible through the grid openings wherein the partial partition sections associated with the respective grid openings have at least one cut or separation all in accordance with the present invention.

The grid openings are bounded in an embodiment of the invention according to FIG. 4 in the outer region by a triangle but are circular in the center. All corners are rounded in order to prevent damage to the partition 11 under operating conditions. A single straight separation or cut 14 is associated with some of the grid openings in the center of the opening. The separation 14 cuts through the partition vertically without removal of material. The length of each separation is, by way of example, 7 mm for a partition having a thickness of 1.5 mm.

Figure 5:
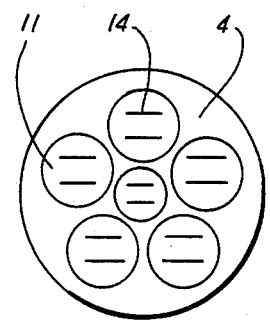

In the embodiment of the invention according to FIG. 5, all grid openings have circular boundaries and in each individual grid opening, two mutually parallel straight separations 14 are visible. The separations have a length of, e.g., 7 mm each. With a partition thickness of 1.5 mm, the mutual spacing of the separations 14 is, by way of example, 4 mm.

The embodiments of the present invention according to FIGS. 6 to 11 correspond to those according to FIG. 5 as far as the grids 15 used and the examplary thickness of the partition 11 are concerned.

Figure 6:
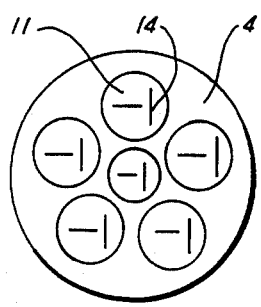

In the embodiment of FIG. 6, two separations 14 which are related to each other in T-fashion are visible in each gird opening. Their mutual spacing is, e.g., 2.4 mm and the respectively length of each is, e.g., 7 mm.

Figure 7:
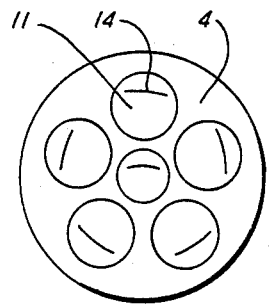

FIG. 7 illustrates an embodiment of the invention wherein the separations 14 extend parallel to the outside circumference of the partition 11. The central opening contains a separation 14 in the shape of a circular segment.

Figure 8:
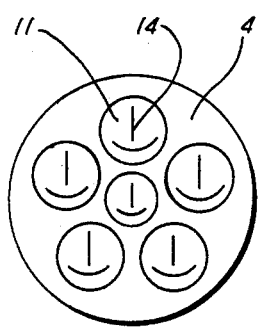

FIG. 8 illustrates an embodiment of the invention wherein two separations 14 are arranged in each grid opening. One of these separations is straight and its extension intersects centrally the other separation made in the form of a circular segment. The mutual distance is, e.g., 2.4 mm and the respective lengths are, e.g., 7 and 8.4 mm, respectively.

Figure 9:
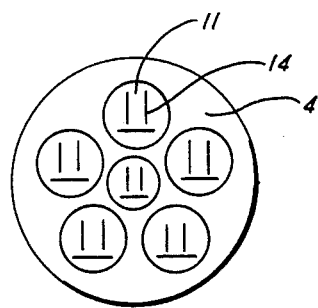

The embodiment of the invention according to FIG. 9 resembles that of FIG. 8 with the difference that two vertically arranged mutually parallel cuts 14 are associated with a horizontal separation 14. Mutual spacing is always, e.g., 2.4 mm and the lengths are, e.g., 7 mm.

Figure 10:
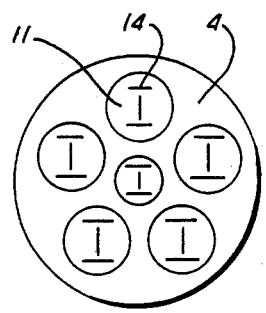

FIG. 10 illustrates an embodiment of the invention wherein three straight separations 14 are mutually related so that the extension of a vertically oriented cut 14 intersects centrally on both sides of the two horizontally oriented separations. The mutual spacing is, e.g., 2.4 mm and the lengths are, e.g., 7 mm.

Figure 11:
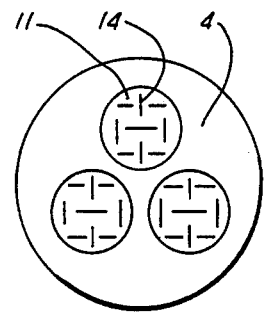

FIG. 11 illustrates an embodiment of the present invention wherein a multiplicity of cuts 14 are arranged as lines which intersect each other at right angles. All separations 14 have identical length and a constant mutual spacing.

Figure 12:
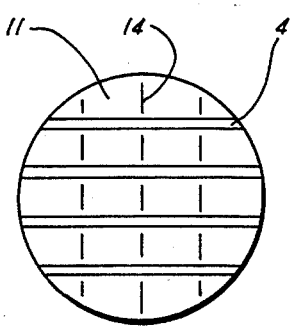
Figure 13:
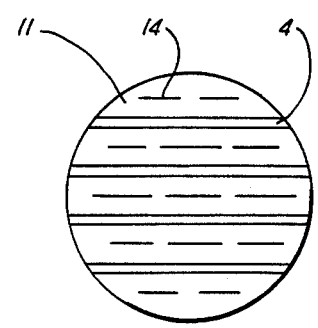
Figure 14:
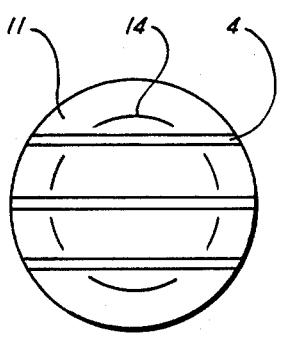

FIG. 12 to 14 illustrate embodiments of the present invention wherein the grids 4, 5 are related to each other with mirror symmetry and only have grid bars 15 which are parallel to each other.

The partition 11, in accordance with the embodiment of the invention of FIG. 12, is provided with mutually parallel separations 14 which are oriented perpendicularly to the parallel orientation of the grid bars 15.

In the embodiment of the invention according to FIG. 13, the separations 14 are oriented parallel to the parallel orientation of the grid bars 15. The separations 14 are arranged on continuous straight lines, have, e.g., a length of 12 mm each, and are separated from each other by a bridge, e.g., 3 mm wide.

In the embodiment of the invention illustrated in FIG. 14, a separation 14 continuously closes on itself and is parallel to the outside circumference of the partition 11.

Figure 15:
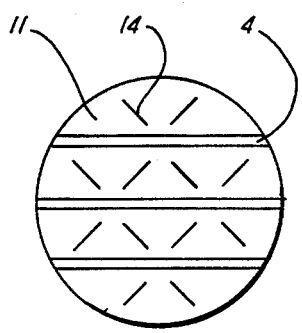

In the embodiment of the invention according to FIG. 15, the individual separations 14 are arranged at an angle of 45° relative to the parallel orientation of the grid bars 15.

Figure 16:
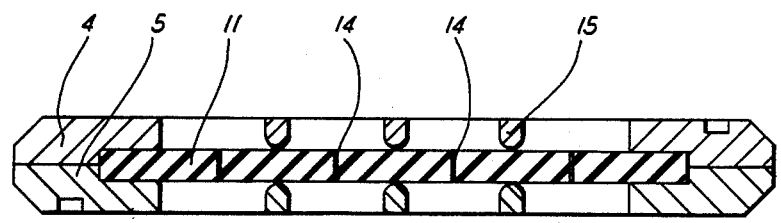
FIG. 16 is a cross-sectional schematic detail illustrating two grids mounted with mirror symmetry which enclose between them a partition in rest position in accordance with the present invention.
Figure 17:
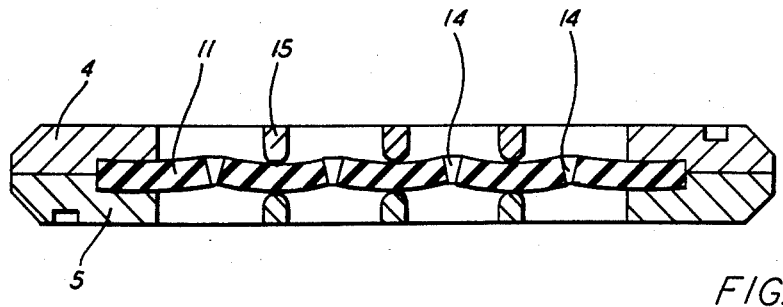
FIG. 17 is a cross-sectional schematic detail illustrating the grids and partition of FIG. 16 with a maximum bulging of the partition in accordance with the present invention.

FIGS. 16 and 17 illustrate the operating behavior of the partition 11 of the motor mount in accordance with the present invention FIG. 16 illustrates the partition 11 in the rest position. The partition 11 is clamped flat between the grids 4, 5 which are related to each other in mirror symmetry. The boundary surfaces of the separations 14, which are generated without removal of material, rest directly against each other. In the situation shown, the partition 11 is substantially completely impervious to liquid flow therethrough.

FIG. 17 illustrates the embodiment according to FIG. 16 in an operating situation in which the underside of partition 11 is acted upon by a higher hydraulic pressure. It can be clearly seen that the partition 11 is prevented from giving way by the grid bars 15. However, the partition 11 bulges in the grid openings, and the separations 14 are enlarged to form a gap. In the system under discussion, the separations 14 open only briefly but this is sufficient to prevent the occurrence of cavitation phenomena. The motor mount, in accordance with the present invention, is distinguished for this reason not only for providing good isolation behavior if high-frequency vibrations are introduced but also by providing good damping behavior if low-frequency vibrations of a wide frequency spectrum are introduced. In addition, the motor mount, in accordance with the present invention, has an excellent service life and results in minimal development of noise during operation.

Although preferred embodiments of the present invention have been described in detail, it is contemplated that modifications may be made by one skilled in the art within the spirit and the scope of the present invention.

What is claimed is:

1. In a hydraulically damped elastic mount for vibrating equipment comprising:
   a bearing core, an annular elastic member and a bottom plate enclosing a working spaced for receiving a hydraulic liquid;
   means for providing a variable volume equalization space in association with said working space with said working space and said equalization space forming an enclosed receptacle for retaining received hydraulic liquid;
   two grid plates having grid bars disposed between said working space and said equalization space;
   a thin partition fabricated from a soft elastic material disposed between said two grid plates having partial regions associated with grid openings;
   means for providing a permanently open choke opening fluid passage between said working space and said equalization space;
   the improvement comprising:
   said grid bars of both grids continuously abut against said partition clamping said partition therebetween;
   the smallest width of said grid openings of each grid is about 1.5 to 25 times the thickness of said partition; and
   a plurality of said partial regions of said partition associated with a plurality of said grid openings each has at least one separation comprising a cut having a maximum width of 0.2 times the thickness of said partition whereby said separations permit liquid flow in a first direction from said working space to said equalization space and in a second direction from said equalization space to said working space responsive to the pressurization of said received hydraulic liquid.

2. A device as recited in claim 1 wherein said separation comprises a cut made without removal of material.

3. A device as recited in claim 1 wherein said separation has a length of at least three times the thickness of said partition.

4. A device as recited in claim 1 wherein said separation is a straight line.

5. A device as recited in claim 1 wherein said separation has a uniformly curved shape.

6. A device as recited in claim 1 wherein several separations are related to each other in a pattern.

7. A device as recited in claim 6 wherein said pattern comprises mutually parallel separations wherein the mutual spacing is at least as large as the thickness of said partition.

8. A device as recited in claim 6 wherein said pattern comprises mutually intersecting lines wherein the mutual spacing is at least as large as the thickness of the partition.

9. A device as recited in claim 1 wherein said separation goes through said partition at an angle with respect to the surface of said partition.

10. A device as recited in claim 1 wherein said separation is located on said partition outside the center of at least one grid opening.

11. A device as recited in claim 1 wherein all of said partition partial regions associated respectively with all of said grid openings each has at least one of said separation.

* * * * *